United States Patent
Vanosdall et al.

(10) Patent No.: US 9,844,182 B1
(45) Date of Patent: Dec. 19, 2017

(54) THORN COLLECTOR

(71) Applicants: Lyle Lester Vanosdall, Wilder, ID (US); Christopher Blaize Varuska, Homedale, ID (US)

(72) Inventors: Lyle Lester Vanosdall, Wilder, ID (US); Christopher Blaize Varuska, Homedale, ID (US)

( * ) Notice: Subject to any disclaimer, the term of this patent is extended or adjusted under 35 U.S.C. 154(b) by 780 days.

(21) Appl. No.: 14/059,436

(22) Filed: Oct. 21, 2013

(51) Int. Cl.
*A01D 51/00* (2006.01)
*E01H 1/10* (2006.01)

(52) U.S. Cl.
CPC ........... *A01D 51/00* (2013.01); *A01D 51/002* (2013.01); *E01H 1/106* (2013.01)

(58) Field of Classification Search
CPC combination set(s) only.
See application file for complete search history.

(56) References Cited

U.S. PATENT DOCUMENTS

| | | | |
|---|---|---|---|
| 2,167,337 A | | 7/1939 | Maurice |
| 2,653,337 A | * | 9/1953 | Bathurst ............... A47L 13/146 15/119.2 |
| 2,729,046 A | * | 1/1956 | Patterson ............. A01D 51/002 198/506 |
| 3,401,507 A | * | 9/1968 | Yetter .................... A01D 82/00 56/1 |
| 4,077,533 A | * | 3/1978 | Meyer .................. A63B 47/021 414/440 |
| 2006/0180513 A1 | * | 8/2006 | Mang .................. A01D 51/002 209/420 |
| 2012/0145190 A1 | * | 6/2012 | Vice ........................ E01H 15/00 134/6 |

FOREIGN PATENT DOCUMENTS

AU       2004200779 A1 *  2/2005

OTHER PUBLICATIONS

McKenzie, Kathryn, Goathead Thorn: Last but Not Least of the Evil Plants, Mar. 12, 2008, Yahoo! Contributor Network, available at http://voices.yahoo.com/goathead-thorn-last-but-not-least-evil-plants-12 . . . (last accessed Sep. 2, 2013).

* cited by examiner

*Primary Examiner* — Alicia Torres
(74) *Attorney, Agent, or Firm* — Jeffrey Parry Intellectual Property Law Group PLLC; Jeffrey C. Parry

(57) ABSTRACT

An apparatus for collecting thorns, spines, prickles, seeds, burrs, and the like from the ground. Embodiments of the present disclosure include a roller for picking up thorns, spines, prickles, seeds, burrs, and the like from the ground, a scraper to remove the picked-up objects from the roller, and a collector tray to catch and collect the removed objects. In embodiments, the roller comprises a cylindrical foam roller. In embodiments, the scraper comprises a mesh screen rolled into a cylinder-like form and held adjacent to or against the roller. Objects that are removed from the roller may be ejected and/or fall into the collector tray for subsequent disposal.

19 Claims, 6 Drawing Sheets

THORN COLLECTOR

BACKGROUND

Technical Field

The present disclosure relates generally to a device for collecting dispersed thorns, spines, prickles, seeds, burrs, and the like from the ground. In particular, the present disclosure relates to a device for gathering thorns and the like from a surface such as a sidewalk, road, or other ground surface.

Description of Related Art

Throughout most the world, certain plants produce hard, durable products that have one or more pointed and/or hooked ends. Such products may commonly be known as thorns, prickles, stickers, burrs, or spines. Within the present disclosure, such plant products may generally be referred to as "thorns" throughout, and any such reference may include a variation of a plant products having pointed ends, barbs, hooks, or other attachment means. (For example, a burr can attach to fur or clothing via small hook-like protrusions.)

Many types of thorns are plant seeds and employ the attachment means as dispersal mechanisms due to a thorn's propensity to attach to animal fur and/or skin, clothing, and other mobile objects. Thorn-producing plants include *Tribulus terrestris* (commonly known as puncturevine or goathead), *Xanthium strumarium* (commonly known as common cocklebur), *Cenchrus longispinus* (commonly known as spiny burr grass), *Emex spinosa* (commonly known as devil's thorn), and many others.

Thorns may be dropped by their producing plants in numerous quantities. Wind, animals, humans, and other dispersal means may subsequently cause thorns to be dispersed across the ground, on sidewalks, and over roadways, making them difficult to remove and causing injury to people and animals and damage to bicycle, automobile, and other tires.

Current thorn removal methods may include collecting thorns by hand or dragging an object made of a soft material such as a blanket, a carpet, or a foam block across the ground. Once used, the object is typically disposed of due to the difficulty of removing the thorns from the object. One inherent weakness of dragging a thorn-collecting object across the ground is that such methods may not include a continuous motion, but rather employ numerous repeated dragging motions. Such methods also typically lead to unsatisfactory results due to the amount of thorns left behind.

SUMMARY

In one embodiment, a thorn collector is disclosed. The thorn collector comprises a frame, an axle mounted to the frame, a cylindrical foam roller on the axle, a wire mesh scraper, a collector tray, and an attachment mechanism. The foam roller has free rotation relative to the frame. The scraper is held proximate to the foam roller by scraper arms. The scraper is adapted to remove a thorn from the foam roller. The collector tray is adapted to catch the thorn. The attachment mechanism is mounted on the frame.

In an additional embodiment, a thorn collector is disclosed. The thorn collector includes a cylindrical roller, a scraper, and a collector tray. The scraper is proximate to the roller along an axial length of the roller. The collector tray is positioned at least partially below the scraper.

In an additional embodiment, a method of collecting dispersed thorns is disclosed. The method includes moving a thorn collector across a ground surface, thereby causing a roller of the thorn collector to contact and roll across a portion of the ground surface; picking up at least one thorn on the roller; engaging the at least one thorn with a scraper that is held proximate to the roller, thereby causing the at least one thorn to eject from the roller; and catching the at least one thorn in a collector tray.

The present disclosure will now be described more fully with reference to the accompanying drawings, which are intended to be read in conjunction with both this summary, the detailed description, and any preferred or particular embodiments specifically discussed or otherwise disclosed. This disclosure may, however, be embodied in many different forms and should not be construed as limited to the embodiments set forth herein; rather, these embodiments are provided by way of illustration only so that this disclosure will be thorough, and fully convey the full scope of the disclosure to those skilled in the art. Non-limiting and non-exhaustive embodiments of the present disclosure are described with reference to the following figures, wherein like reference numerals refer to like parts throughout the various views unless otherwise specified.

BRIEF DESCRIPTION OF THE FIGURES

Non-limiting and non-exhaustive embodiments of the present disclosure are described with reference to the following figures, wherein like reference numerals refer to like parts throughout the various views unless otherwise specified.

Figure 1:
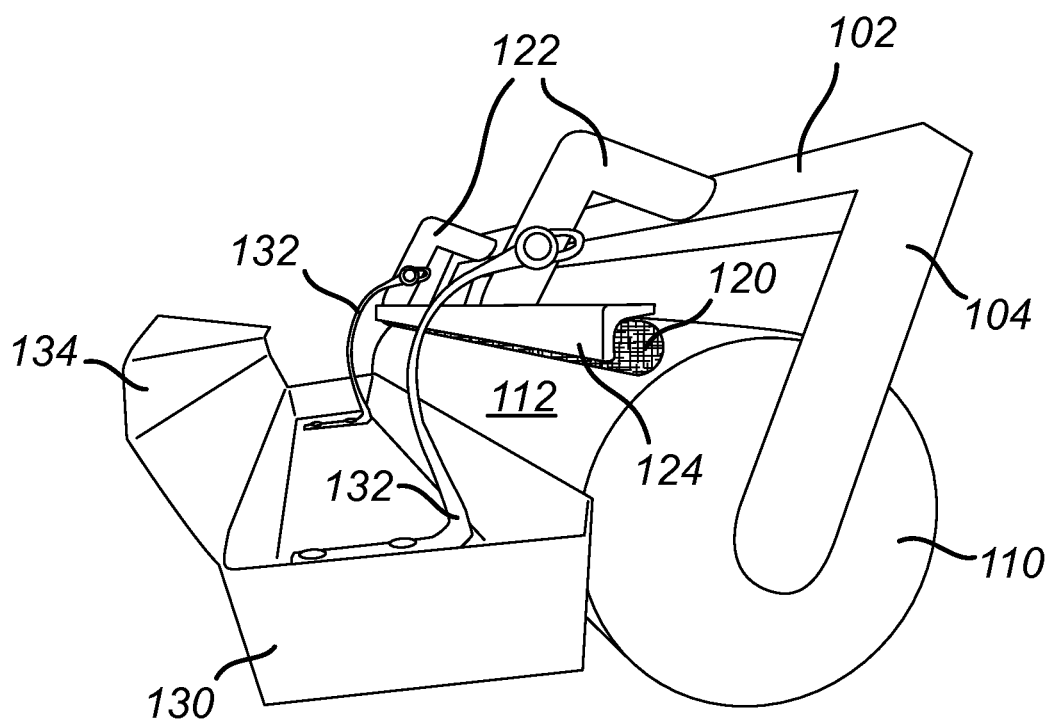
FIG. 1 depicts a side view of a thorn collector according to an embodiment of the present disclosure.
Figure 2:
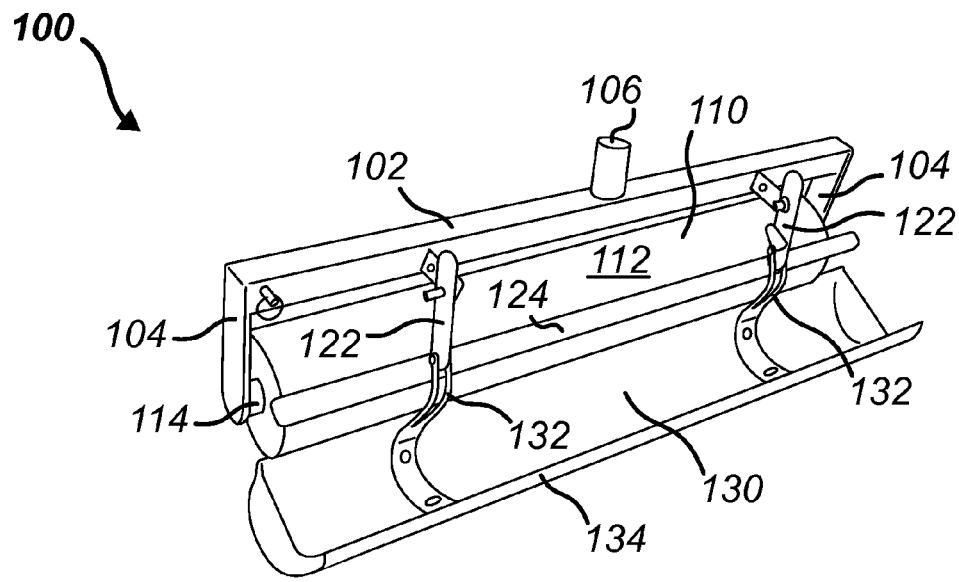
FIG. 2 depicts a perspective front view of a thorn collector according to an embodiment of the present disclosure.
Figure 3:
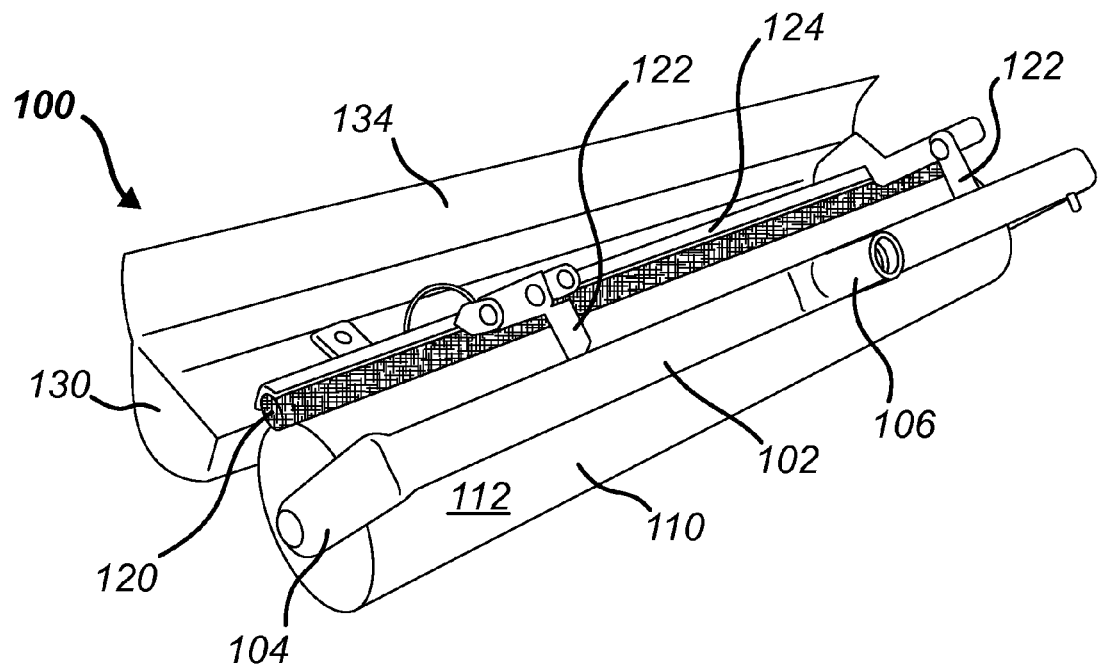
FIG. 3 depicts a perspective rear view of a thorn collector according to an embodiment of the present disclosure.
Figure 4:
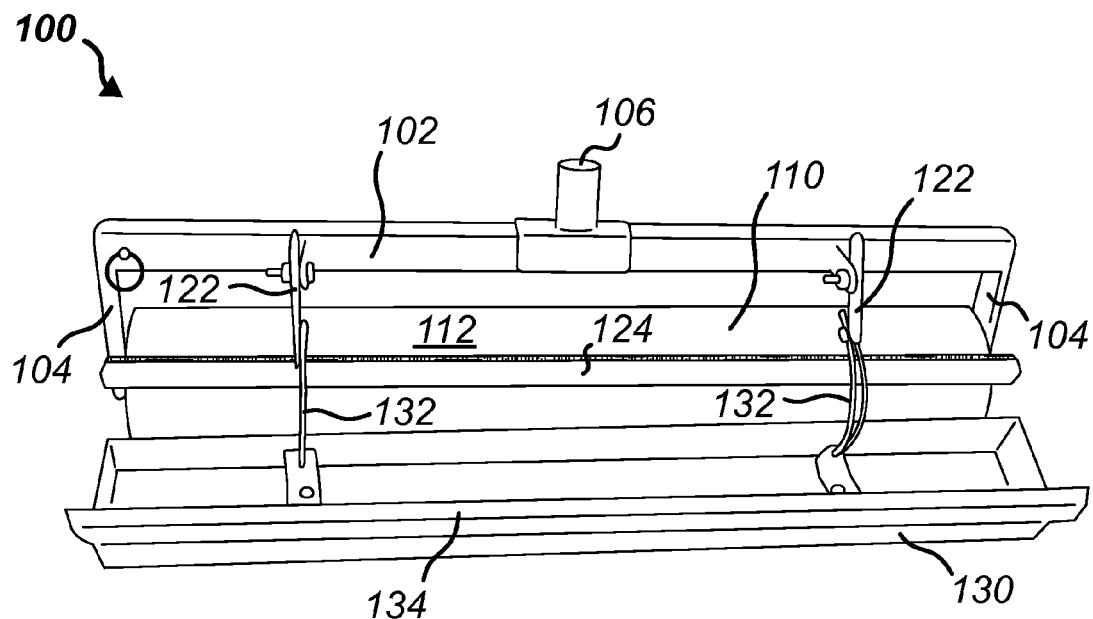
FIG. 4 depicts a front view of a thorn collector according to an embodiment of the present disclosure.
Figure 5:
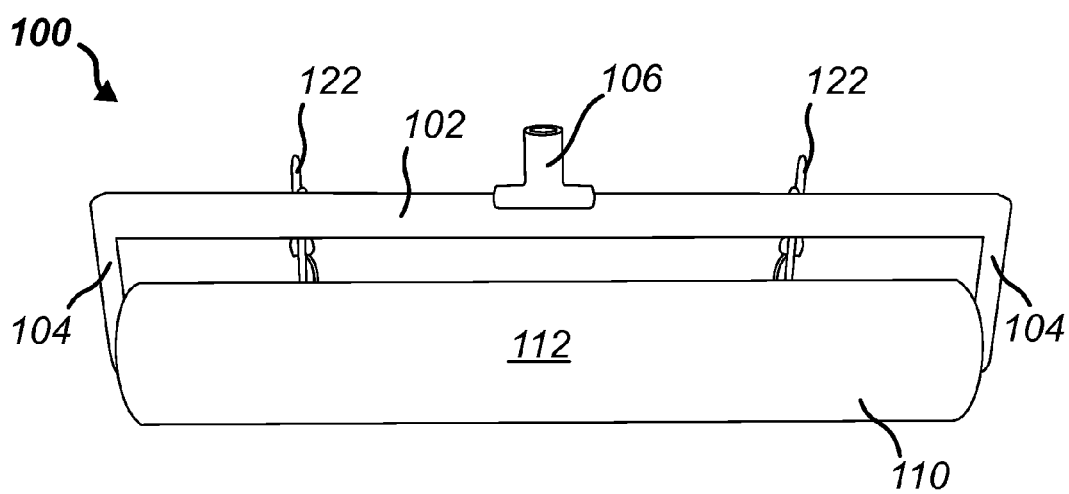
FIG. 5 depicts a rear view of a thorn collector according to an embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the spirit and scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments of the present disclosure comprise a roller apparatus for picking up thorns from a surface. Particular embodiments comprise a roller, a roller scraper, and a collector tray. Embodiments of the present disclosure may be adapted to be pushed and/or pulled by a person. Alternate embodiments may be pushed and/or pulled by a vehicle.

Referring to FIGS. 1-5, according to embodiments of the present disclosure, a thorn collector 100 comprises a frame 102, roller 110, scraper 120, and collector tray 130. Roller 110 comprises a cylindrical roller having thorn collection surface 112 around an axle 114.

In embodiments, roller 110 comprises a foam material. For example, an embodiment comprises a roller 110 made of polyethylene foam similar to a consumer swimming product commonly known as a "pool noodle." In alternative embodiments, other types of foam or other soft, spongy, and/or porous materials are used as a collection surface 112. In an alternative embodiment, roller 110 comprises carpet-like material wrapped around a cylinder-shaped article. In other embodiments, roller 110 can be manufactured from virtually any kind of soft plastic, polyurethane material, or other variations of foam. Additionally, roller 110 may be formed of combinations of the foregoing materials.

Frame forks 104 protrude from frame 102 at a distance roughly equivalent to the length of roller 110 and axle 114. Ends of axle 114 are connected to frame forks 104, thereby allowing free rotation of roller 110 relative to frame 102. In alternative embodiments, roller 110 is mounted to frame 102 and/or frame forks 104 via pins or like hardware that allow free rotation of roller 110 relative to frame 102. In embodiments, frame 102, forks 104, and axle 114 comprise a steel material. In alternative embodiments, other suitable materials may be used. Characteristics that may indicate suitability of a material include relatively light weight, durability, and sufficient strength to withstand sustained use of the thorn collector 100.

Scraper 120 is fixed to frame 102 via scraper arms 122. Scraper arms 122 comprise relatively rigid elements mounted to frame 102. In the embodiments depicted in FIGS. 1-5, scraper arms 122 comprise two steel arms. In other embodiments, virtually any number of scraper arms 122 may be included. In other embodiments, scraper arms 122 may be manufactured from other materials, for example plastics. Scraper arms 122 are adapted to hold scraper 120 at the collection surface 112 of roller 110.

In embodiments, scraper 120 may be held in light contact against collection surface 112 of roller 110 by scraper arms 112 in such a way as to allow rotation of roller 110 while maintaining near-constant contact between scraper 120 and collection surface 112. In embodiments, scraper arms 122 further comprise springs or other resilient materials adapted to apply a holding force to scraper 120 to maintain constant or near-constant contact between scraper 120 and collection surface 112. In other embodiments, scraper 120 may be held near collection surface 112, leaving a small clearance therebetween. Such a clearance may be slightly smaller than anticipated sizes of thorns to be collected. For example, surfaces of scraper 120 may be maintained within roughly 5 millimeters of portions of the collection surface 112 when collecting thorns sized larger than 5 millimeters.

In the embodiment depicted, scraper 120 comprises a wire mesh rolled into a cylinder-like shape and secured in that shape by L-shaped bracket 124. In embodiments, the mesh comprises a woven mesh made of a metal material such as steel. In alternative embodiments, other types of mesh materials and constructions are utilized in scraper 120. Differently-sized openings in the mesh lattice may selectively be used for different scraper 120 implementations. As an example, in one embodiment, scraper 120 comprises 14 mesh stainless steel. Mesh size and/or mesh type of scraper 120 may selectively be modified to suit the terrain, the types and sizes of thorns targeted for collection, the method of movement of thorn collector 100 (i.e. depending on whether the thorn collector 100 may be pushed or pulled, if a person might manually push or pull thorn collector 100, or what type of vehicle might push or pull thorn collector 100), and other factors.

In an embodiment, scraper 120 is formed by rolling a mesh into a cylinder-like shape having an approximate diameter of three-fourths (0.75) of an inch. In alternative embodiments, mesh scraper 120 is rolled into other sizes. Embodiments of the present disclosure comprise a scraper bracket 124 mounted to scraper arms 122 and adapted to hold scraper 120 near roller 110. Scraper bracket 124 can also hold scraper 120 in a desired shape.

In embodiments, collector 130 comprises a tray mounted to frame 102 via collector arms 132. Collector 130 is mounted forward and below scraper 120 so that thorns that are scraped from roller 110 by scraper 120 can be caught in collector 130. Collector 130 comprises a tray shield 134 that extends from a wall of collector 130 that is opposite roller 110 and scraper 120. In embodiments, collector arms 132 are manufactured from a strong, durable material. In alternative embodiments, collector arms 132 comprise clips to secure collector 130 to frame 102. The clips may comprise metal, plastic, various other suitably strong and durable materials, or a combination thereof.

In operation, thorn collector 100 may be pushed or pulled over a ground surface where thorns are dispersed. As collection surface 112 passes over the ground, the pointed ends, hooks, and like elements of the thorns can penetrate or catch onto collection surface 112 and thereby get picked up by roller 110. As the roller 110 rolls around the axle 114 by continued motion of thorn collector 100, thorns are carried around roller toward scraper 120. The motion from roller 110, combined with interaction with scraper 120, is adapted to catch and pull thorns from the roller 110 and deposit the thorns into collector 130. Tray shield 134 may block errant thorns that are propelled by the scraper 120 from roller 110. After collector 130 has filled with thorns, collector 130 may be emptied into another receptacle.

Figure 6:
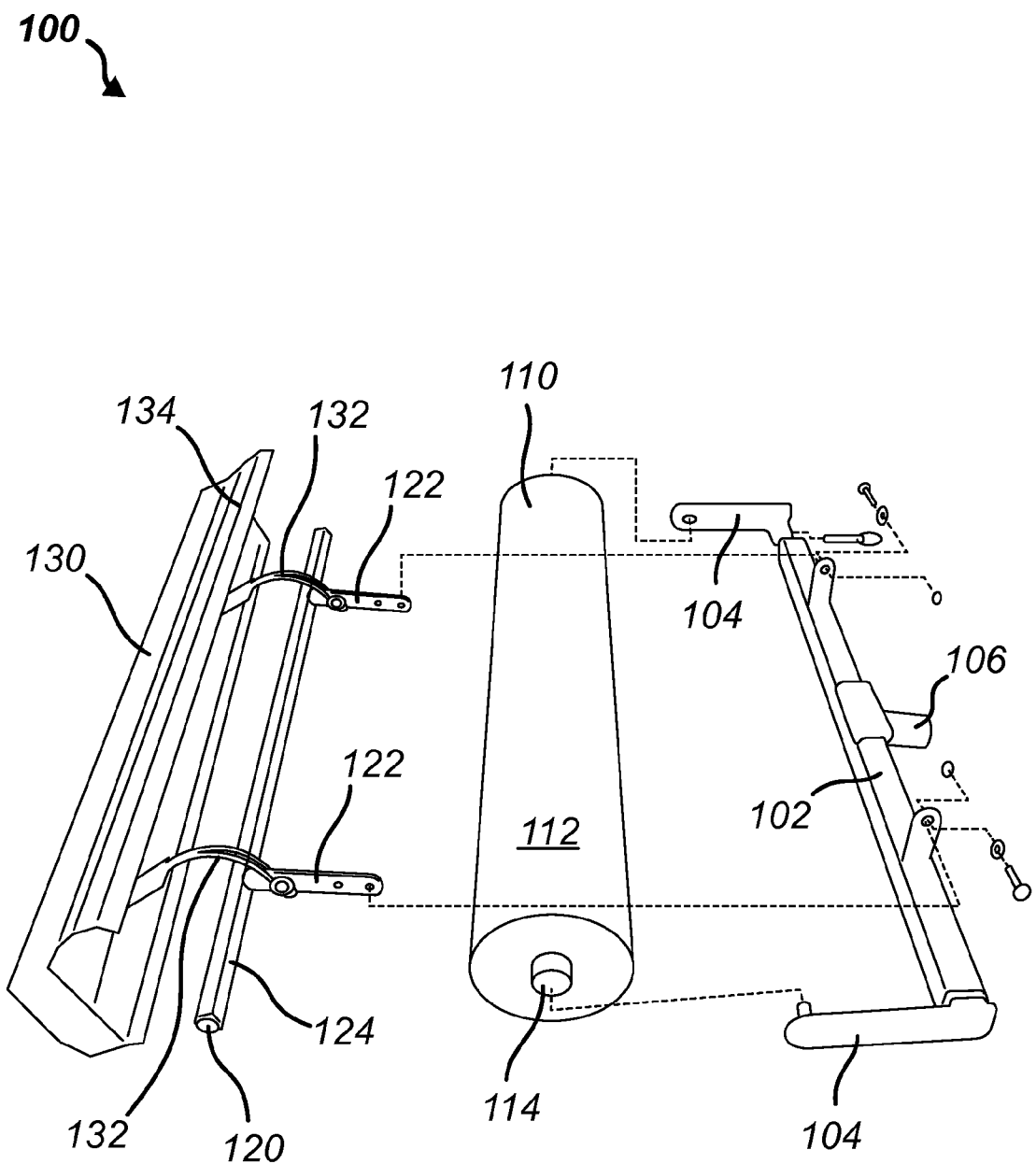
FIG. 6 depicts an exploded diagram of a thorn collector according to an embodiment of the present disclosure.

Referring now to FIG. 6, an exploded diagram of an embodiment of the present disclosure is depicted. From time to time, the collection surface 112 may wear down after normal usage. In such cases, the roller 110 (or alternatively, only the collection surface 112) can be replaced by removing it from the frame 102 by removing or loosening hardware, removing roller 110 or collection surface 114 from axle 114, placing a new roller 110 or collection surface 114 on axle 114, and securing axle 114 to frame 102 by re-securing hardware.

Figure 7:
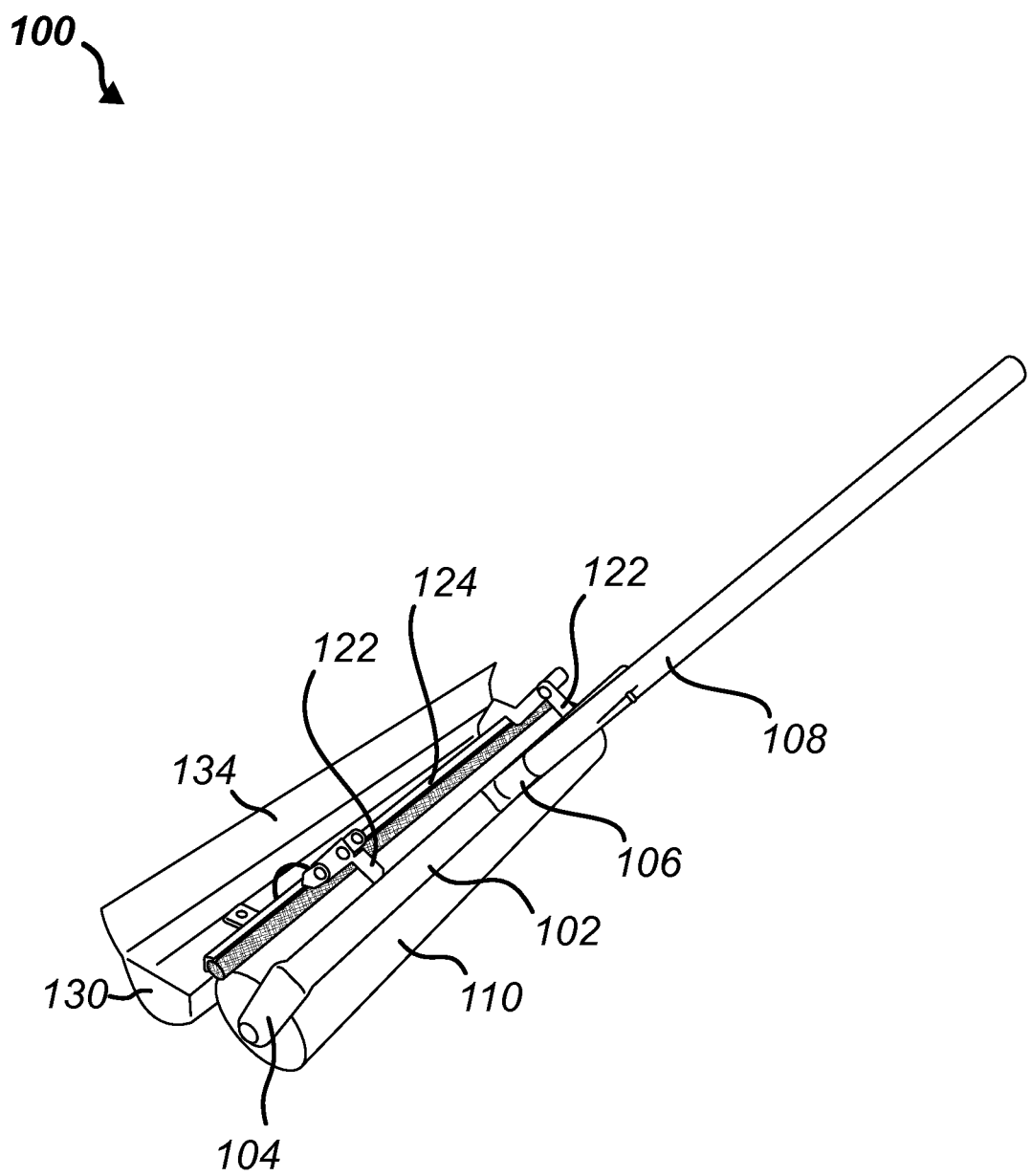
FIG. 7 depicts a thorn collector having a handle according to an embodiment of the present disclosure.
Figure 8:
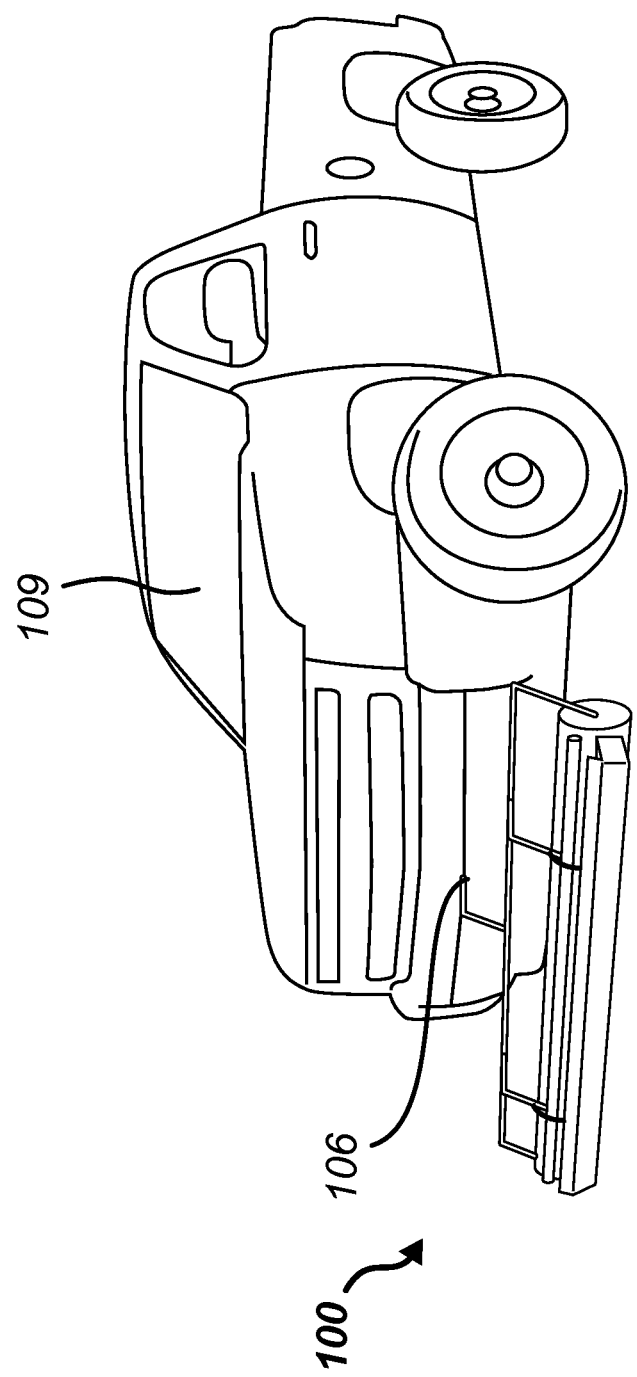
FIG. 8 depicts a thorn collector mounted on a vehicle according to an embodiment of the present disclosure.

Referring now to FIG. 7, embodiments of thorn collector 100 comprise attachment mechanism 106 for securing frame 102 to a handle 108. For example, embodiments of attachment mechanism 106 comprise a threaded socket for connection to a handle 108, extension pole, or the like. As depicted in FIG. 8, in alternative embodiments, frame 102 comprises an attachment mechanism 106 to secure thorn collector to a vehicle 109. Embodiments can be attached to a vehicle 109 such as an ATV, a riding lawnmower, an automobile (including a truck and the like), a tractor, a bicycle, or other means. Embodiments of the thorn collector 100 of the present disclosure are adapted to be pushed, while alternative embodiments are adapted to be pulled. Other embodiments are bi-directional, and may function when pushed or pulled.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed is:

1. A thorn collector, comprising:
a frame;
an axle mounted to the frame;
a cylindrical foam roller on the axle; the foam roller having free rotation relative to the frame;
a wire mesh scraper held proximate to the foam roller by a scraper arm, wherein the scraper is adapted to remove a thorn from the foam roller;
a collector tray attached to the frame, wherein the collector tray is adapted to catch the thorn after the thorn has been removed from the foam roller; and an attachment mechanism mounted on the frame.

2. A thorn collector, comprising:
a foam roller;
a mesh scraper fixed proximate to the roller along an axial length of the roller; and
a collector tray positioned at least partially below the scraper.

3. The thorn collector of claim 2, wherein the scraper further comprises a metal wire mesh.

4. The thorn collector of claim 2, wherein the roller comprises a porous collection surface.

5. The thorn collector of claim 2, wherein the roller comprises a foam collection surface.

6. The thorn collector of claim 2, wherein the roller comprises a polyethylene foam collection surface.

7. The thorn collector of claim 2, further comprising an axle, wherein the roller is mounted on the axle.

8. The thorn collector of claim 2, further comprising a frame.

9. The thorn collector of claim 8, wherein the frame is mounted to a vehicle.

10. The thorn collector of claim 8, wherein the frame further comprises a handle.

11. The thorn collector of claim 2, further comprising a spring for applying a force to the scraper, wherein the force is directed in a direction toward the roller.

12. The thorn collector of claim 2, wherein:
the roller comprises a collection surface;
the scraper comprises a scraper surface; and
a portion of the scraper surface is adapted to remain within 5 millimeters of a portion of the collection surface.

13. The thorn collector of claim 2, wherein:
the roller comprises a collection surface;
the scraper comprises a scraper surface; and
a portion of the scraper surface is adapted to remain within 2 millimeters of a portion of the collection surface.

14. The thorn collector of claim 2, wherein:
the roller comprises a collection surface;
the scraper comprises a scraper surface; and
a portion of the scraper surface is adapted to remain within 1 millimeter of a portion of the collection surface.

15. A method of collecting dispersed thorns, comprising:
moving a thorn collector across a ground surface, thereby causing a foam roller of the thorn collector to contact and roll across a portion of the ground surface;
picking up at least one thorn on the roller;
engaging the at least one thorn with a mesh scraper that is held proximate to the roller, thereby causing the at least one thorn to eject from the roller; and
catching the at least one thorn in a collector tray.

16. The method of claim 15, wherein the at least one thorn comprises at least one selected from the group consisting of thorns, spines, stickers, prickles, seeds, and burrs.

17. The method of claim 15, wherein the roller comprises a foam collection surface.

18. The method of claim 15, wherein the scraper comprises a curved mesh.

19. The method of claim 15, wherein the scraper comprises a metal mesh.

* * * * *